United States Patent [19]

Cooper et al.

[11] B 4,014,859
[45] Mar. 29, 1977

[54] PRODUCTION OF POLYETHYLENE

[75] Inventors: Richard Roy Cooper, St. Albans; Kenneth Stephenson Whiteley, Welwyn Garden City, both of England

[73] Assignee: Imperial Chemical Industries Limited, London, England

[22] Filed: Mar. 29, 1974

[21] Appl. No.: 456,384

[44] Published under the second Trial Voluntary Protest Program on April 6, 1976 as document No. B 456,384.

[30] Foreign Application Priority Data

Mar. 29, 1973 United Kingdom ............ 15156/73

[52] U.S. Cl. .................................. 526/65; 23/288 R; 23/289; 23/290; 526/67; 536/73; 526/78; 526/82; 526/349; 526/352
[51] Int. Cl.² .................. C08F 10/02; C08F 10/08; C08F 110/02; C08F 210/08
[58] Field of Search ................. 260/94.9 R, 94.9 P, 260/94.9 B, 94.9 D, 94.9 E, 88.2 B, 88.2 F; 23/289, 290, 288 R

[56] References Cited
UNITED STATES PATENTS

| | | | |
|---|---|---|---|
| 2,882,264 | 4/1959 | Barnes et al. | 260/94.9 B |
| 2,953,552 | 9/1960 | Stampa et al. | 260/94.9 E |
| 3,073,809 | 1/1963 | Kluiber et al. | 260/88.2 F |
| 3,309,350 | 3/1967 | Kelley et al. | 260/88.2 B |
| 3,405,115 | 10/1968 | Schappert et al. | 260/94.9 R |
| 3,551,397 | 12/1970 | Ratzsch et al. | 260/94.9 R |
| 3,654,254 | 4/1972 | Job et al. | 260/94.9 B |
| 3,732,198 | 5/1973 | Whiteley et al. | 260/88.2 F |

*Primary Examiner*—Alan Holler
*Attorney, Agent, or Firm*—Cushman, Darby & Cushman

[57] ABSTRACT

Ethylene is polymerized or copolymerized using a pressure of at least 300 kgm/cm² and a multi-zone (i.e. two or more) reaction vessel wherein the feed to the first zone is fresh ethylene, which is preferably mixed with recycle gas from the low pressure hopper and into at least a subsequent zone there is introduced a feed containing return gas recycled from the separator. By this technique the composition of the gas feed to the various zones can be varied, for example the hydrogen content of the gas streams to the various zones can be varied and this can produce a polymer of broader molecular weight distribution.

15 Claims, 4 Drawing Figures

PRODUCTION OF POLYETHYLENE

The present invention relates to the polymerisation of ethylene and in particular to the polymerisation of ethylene at elevated pressures.

Ethylene may be polymerised or copolymerised at low pressures using a catalyst including a transition metal compound or at high pressures when the catalyst is typically a compound which is capable of producing free radicals. However, as described in British Pat. No. 1,253,046 the polymerisation of ethylene can be effected at high pressure using a catalyst including a transition metal component. In a typical continuous high pressure process, the reactant mixture in the polymerisation reactor is under super-critical conditions and is passed to a separator at a lower pressure in which the polymer separates from a large proportion of the gas. The polymer is then passed to a hopper at a lower pressure than the separator and in the hopper most of the gas which remains dissolved in the polymer is removed and the polymer is then passed to an extruder. The gases removed from the polymer in the hopper are recompressed, mixed with the gas from the separator, make up ethylene (and comonomer) as required, compressed further (up to the reactor pressure) and returned to the polymerisation reactor. Catalyst is added to the reactor and the polymerisation may be effected in in several zones maintained at different temperatures. If polymerisation is effected in a multizone system, a proportion of the feed gas may be introduced into each zone.

According to the present invention there is provided a process for the polymerisation or copolymerisation of ethylene in two or more reaction zones wherein a product mixture of ethylene, ethylene polymer and one or more of comonomer, chain transfer agent and inert diluent, at a pressure in the range 300 to 3000 $kgm/cm^2$ is passed from a reaction zone into a separator maintained at a pressure below the pressure of the product mixture whereby separation occurs into a gas phase and a liquid phase comprising the ethylene polymer and dissolved gas, passing the liquid phase to a low pressure hopper maintained at a pressure below the of the separator whereby the major portion of the dissolved gas is removed from the polymer, compressing the gas from the low pressure hopper to an intermediate pressure, passing a stream of fresh ethylene and optionally comonomer and/or insert diluent and/or chain transfer agent, optionally mixed with the compressed gas from the low pressure hopper, to a compressor, compressing this gas stream and passing it to the first zone of the polymerisation reactor, passing the gas phase from the separator, optionally mixed with the compressed gas from the low pressure hopper, and/or a chain transfer agent and/or a stream of fresh ethylene optionally containing comonomer and/or inert diluent, to a compressor, compressing this gas stream and passing it to at least one zone, other than the first zone, of the polymerisation reactor, and introducing a polymerisation catalyst directly or indirectly into at least the first zone of the polymerisation reactor.

The pressures of the separator and the low pressure hopper are selected to give phase separation (in the separator) and removal of the dissolved gas (in the low pressure hopper) and the actual pressures will be dependent primarily on the composition of the reaction mixture and to a lesser degree on its temperature. If the feed to the polymerisation reactor is of predominantly pure ethylene then the pressure in the separator is conveniently in the range 200 to 400 $kgm/cm^2$. However, if the ethylene contains an inert diluent and/or comonomer(s) in an amount of in excess of 50% by weight of the total mixture then the pressure in the separator is conveniently 20 to 150 $kgm/cm^2$. The pressure in the low pressure hopper is typically in the range 0.1 to 10 $kgm/cm^2$, and preferably 1 to 5 $kgm/cm^2$.

Using the technique of the present invention, the composition of the reactant mixture introduced into the first zone can differ from that of the reactant mixture introduced into the subsequent zones. If the various reactant mixtures contain different proportions of comonomer, the polymer obtained will have a variable composition. Alternatively, the various reactant mixtures may contain different proportions of a chain transfer agent, particularly hydrogen, and this can affect the molecular weight distribution of the polymer product. Thus the present invention provides a technique for controlling the characteristics of the polymer product by providing for adjustment of the nature of the feed to the different zones of a multi-zone reaction vessel.

If a chain transfer agent is used, a polymer of broader molecular weight distribution can be obtained by feeding monomer containing little, if any, chain transfer agent to the first zone and adding monomer with a high proportion of chain transfer agent to at least one subsequent zone. To increase the molecular weight distribution further, the reaction conditions can be adjusted to give control of the temperature in each zone. It is preferred that a chain transfer agent is used and that all of the additional chain transfer agent is introduced into a gas stream which is ultimately passed into a polymerisation zone subsequent to the first zone.

In one embodiment of the present invention, polymerisation is effected in two zones, the gas from the low pressure hopper is compressed, mixed with fresh ethylene, compressued further and introduced into the first zone of the polymerisation reactor and the gas from the separator is mixed with fresh ethylene, compressed and introduced into the second zone of the polymerisation reactor.

If hydrogen is used as a chain transfer agent the gas introduced into the first zone contains only a minor proportion of hydrogen whereas the material introduced into the second zone contains a higher proportion of hydrogen. The difference in the hydrogen contents of the two gas streams is a result of the volatility of hydrogen which concentrates in the gas phase in the separator with very little being dissolved in the polymer. The gas removed from the low pressure hopper therefore contains a much lower proportion of hydrogen than the gas removed from the separator. If desired the difference in hydrogen levels can be increased by mixing make-up hydrogen with the gas from the separator, this make-up hydrogen being in an amount sufficient to replace the hydrogen lost from the system.

It will be appreciated that it is necessary to replenish not only the ethylene but also any comonomer, diluent or chain transfer agent which is used.

Thus, fresh ethylene may be introduced into the first zone of the polymerisation reactor and the recycled gases from the separator and the low pressure hopper can be combined and introduced into the second and/or other subsequent zones. The major proportion of any chain transfer agent used is mixed with the recycle gas and introduced into the second zone of the polymerisation reactor. If desired the ethylene gas introduced into the first zone of the polymerisation reactor may contain some of the chain transfer agent but it will generally be found more convenient to add all the chain transfer agent to the recycled gases. The recycled gases may be mixed with fresh ethylene gas if required.

If copolymers are being produced, the compositions of the gas mixtures obtained from the separator and low pressure hopper will be dependent on the relative solubilities of the gases in the molten polymer but in general the gas from the low pressure hopper will contain a higher proportion of comonomer. Similarly, if polymerisation is being effected in the presence of an inert diluent, the gas from the low pressure hopper will contain a higher proportion of diluent. However, if the gas mixture from the low pressure hopper is mixed with fresh ethylene only, the amount of ethylene added will usually be such that the comonomer and/or diluent content of the mixed feed will be equal to or possibly, less than, the average comonomer and/or diluent content. However, it is preferred that, in addition to the fresh ethylene, extra diluent and/or comonomer is added to the gas stream from the hopper which is then recycled to the first zone of the polymerisation reactor.

Polymerisation may be effected in at least three zones and conveniently the gas from the low pressure hopper is compressed, mixed with fresh ethylene, compressed further and introduced into the first zone of the polymerisation reactor. In such a system, whilst it is convenient to add a chain transfer agent, and optionally fresh ethylene, to the gas from the separator, in order to obtain an increased molecular weight distribution it may be preferred to divide the gas from the separator into two streams, introduce fresh ethylene into one of the streams which is compressed and passed to at least the second zone of the polymerisation reactor, whilst a chain transfer agent, and optionally further fresh ethylene, is introduced into the other stream which is compressed and introduced into a zone, for example the third zone, of the polymerisation reactor which is distinct from, and subsequent to, any zone into which the other part of the gas from the separator is introduced. Using such an arrangement the polymer product may be removed from the second zone to give a product of increased molecular weight distribution. In a more simple arrangement using a 3-zone polymerisation reactor, gas streams are introduced into the first two zones and a stream including the polymer product is withdrawn from the third zone. It will be appreciated that the product mixture may be withdrawn from a zone to which there is no direct feed of ethylene from the compressor, or from a zone to which there is a direct feed of ethylene from the compressor.

The gas streams are compressed in a suitable compressor up to the polymerisation reactor pressure and such a compressor may comprise cylinders in parallel. With a multi-cylinder compressor each different stream is passed through a different cylinder, one or more cylinders being used for each stream.

The process of the present invention is effected continuously with recycle of the unreacted gas and may be effected in a continuous stirred reactor or a continuous tubular reactor which is effectively divided internally into two or more zones to give a multi-zone process.

The process of the present invention may be carried out using any catalyst which is suitable for the polymerisation of ethylene at elevated pressure. Thus the catalyst may be one capable of forming free radicals, examples of such catalysts being 3,5,5-trimethyl hexanoyl peroxide, $t$-butyl peracetate, $t$-butyl perbenzoate, $t$-butyl-per-2-ethyl hexoate, $t$-butyl-per-pivalate and di-$t$-butyl peroxide. Alternatively the catalyst may be one including a transition metal compound, such catalysts including the oxides of chromium or molybdenum on suitable supports such as silica or alumina, the Ziegler catalyst systems or the organo-compounds of transition metals including the $\pi$-allyl, benzyl, norbornyl, arene, cyclopentadienyl or materials of the type exemplified by the neopentyl and substituted silylmethyl derivatives. The Ziegler catalyst systems comprise a combination of a compound of a transition metal of Groups IVA to VIII particularly Groups IVA to VIA, and an organo-compound compound of a non-transition metal compound of Groups IA to IIIA particularly organo-aluminium compounds. The organo-compounds of the transition metals and the Ziegler catalysts may be used directly or may be supported on a suitable matrix material such as silica, alumina or magnesia and indeed many organo-compounds of transition metals are useful polymerisation catalysts only when supported. Suitable organo-compounds of the transition metals include tris($\pi$-2-methallyl)chromium, tris($\pi$-allyl)chromium, tetrakis($\pi$-allyl)zirconium, tetrakis($\pi$-2-methallyl)-zirconium, tris($\pi$-allyl)zirconium bromide, tris($\pi$-allyl)-zirconium chloride, titanium tetrabenzyl, zirconium tetrabenzyl, hafnium tetrabenzyl, zirconium tetrakis-(naphthylmethyl), zirconium tetrakis(4-methylbenzyl), trisbenzyl zirconium chloride, zirconium tetrakis(1-methylene-1-naphthyl), titanium tetrakis(1-methylene-1-naphthyl), zirconium tetranorbornyl, zirconium tetrakis-(trimethylsilymethyl), bis(-cyclopentadienyl)chromium(II), bis($\pi$-allyl)chromium(II), dibenzene chromium, ditoluene chromium, $\pi$-benzene chromium tricarbonyl, $\pi$-cumene chromium tricarbonyl and $\pi$-cycloheptatriene chromium tricarbonyl. The preferred Ziegler catalysts comprise a combination of a compound, particularly the halide, of a transition metal of Groups IVA to VIA and an organo-aluminium compound, for example $VCl_3$, $VOCl_2$ or particularly $TiCl_3$ in combination with an aluminium trialkyl or an aluminium dialkyl halide, such as aluminium triethyl, aluminium tri-isobutyl or diethyl aluminium chloride. The transition metal organo-compounds, especially those of chromium, are preferably used supported on a suitable matrix material such as an inorganic oxide. Benzyl compounds and their use as polymerisation catalysts are described in British patent specification No. 1,265,747. Compounds of the type zirconium tetrakis (trimethylsilymethyl) are described in British patent specification No. 1,265,564. The use of supported organo-transition metal compounds as polymerisation catalysts is described in British patent specification No. 1,314,828. The use of supported chromium compounds as polymerisation catalysts is described in British patent specification Nos. 1,253,063, 1,264,393 and 1,298,220 and U.S. patent No. 3,123,571 and 3,157,712.

The catalysts used are preferably used as solutions in a suitable polymerisation inert diluent or as a fine dispersion which can be used without damaging the seals on the compressors and pumps. Catalysts of the Ziegler type which include a solid transition metal component can be dispersed by using the catalyst to polymerise a small proportion of one or more 1-olefine monomers under conditions to form and amorphous polymer and thereby cause dispersion of the catalyst, for example as described in British patent specification Nos. 1,253,046; 1,295,681 and 1,295,682. This general technique may also be used to give dispersion of supported Ziegler catalysts. Alternatively the solid transition metal component can be dispersed by treating it with a long chain alkanol as described in our copending cognate application 32536/71; 616/72 and 617/72 (corresponding to Belgian Pat. No. 786,203 and Dutch patent application No. 72,09643).

The supported catalysts can be dispersed by a suitable grinding technique or by using an ultrasonic dispersion procedure as described in British patent specification No. 1,314,828.

Alternatively, it is convenient to use a dispersed catalyst which has been dispersed by contacting the catalyst or catalyst support with a polymeric dispersant. More specifically it is preferred to use a dispersion, in an inert diluent, of a solid, transition metal, olefine polymerisation catalyst, wich comprises the said catalyst and a block or graft copolymer, at least one segment of which is adsorbed on the catalyst in the presence of the diluent, and at least one segment of which is soluble in, or solvatable by, the diluent. Such a dispersion is obtained by contacting the catalyst and the copolymer, in the presence of an inert diluent, preferably by milling. The copolymer is preferably a block copolymer such as an AB copolymer of styrene and t-butyl styrene or preferably an AB copolymer of styrene and isoprene. This technique is particularly suitable for the dispersion of a supported catalyst for example a tetrabenzyl compound of a transition metal on alumina or silica.

Under the reaction conditions usually employed in the polymerisation reactor, the catalyst is active for only a short time and it may be necessary to introduce the catalyst into more than one zone and, if desired, different catalysts can be introduced into the different polymerisation zones. The half-life of the catalyst utilised will depend on the reaction conditions, particularly temperature, and with longer catalyst life times, longer residence times of the monomer (or monomers) in the polymerisation reactor may be preferred. It is preferred to introduce the catalyst directly into at least the first zone of the polymerisation reactor, but some catalysts, for example those capable of forming free radicals, can be added to the gas mixture before it is introduced into the polymerisation reactor.

Although the technique of the present invention may be used at polymerisation pressures in the range 300 to 3000 kgm/cm$^2$, or even higher, we prefer to operate at the lower pressures in this range. Thus, as a preferred embodiment the present invention is applied to the polymerisation of ethylene by introducing into the polymerisation reactor a mixture of 0–80% by weight of a volatile, inert diluent, 0–95% by weight of at least one 1-olefine monomer and from 5 up to 80% by weight of ethylene and contacting the mixture with a transition metal polymerisation catalyst at a temperature of from 100° to 350°C and a pressure of from 300 to 1000 kgm/cm$^2$.

The conditions are preferably such that a single phase is maintained in the reaction zones in order to avoid polymer deposits in the reactor. The volatile inert diluent is conveniently an aliphatic hydrocarbon having from 3 to 8 carbon atoms, particularly butane or pentane. The 1-olefine comonomer may be propylene, pentene-1, decene-1 or 4-methyl-pentene-1 but is preferably butene-1 or hexene-1. A mixture of monomers may be used and such a mxiture may be the product of oligomerisation of lower olefines which includes small proportions of higher olefines, that is those having more than 10 carbon atoms.

It is preferred to use a temperature in the range 120°–320°C, particularly from 150° to 250°C and a pressure in the range 400 to 800 kgm/cm$^2$. Under these reaction conditions, the mixture introduced into the reaction zones is preferably 0–60% by weight of an aliphatic hydrocarbon having from 3 to 8 carbon atoms, 0–75% by weight of at least one 1-olefine which is butene-1 or hexene-1 and from 25 up to 60% by weight of ethylene. The material introduced into the reaction zones may include a chain transfer agent such as hydrogen in addition to the mixture of ethylene, diluent and comonomer. It will be appreciated that in accordance with the present invention, the mixture introduced into each zone may have a different composition or a different proportion of chain transfer agent may be introduced into the zones together with the mixture. It may be convenient to add only fresh ethylene to the system and include a dimerisation stage such that a required proportion of the ethylene is converted to butene-1 and possibly other higher olefine monomers, which are then polymerised to give the desired copolymer product.

The polymer formed is separated from the unreacted monomer(s) and any diluent present. The separation techniques used will be those of the high pressure process, but if the reaction pressures are lower than those of the high pressure process, the separation pressures will be correspondingly lower and may be in the range 20 to 80 kgm/cm$^2$. If the catalysts are sufficiently active removal of the catalysts residues will not be necessary.

In a further aspect of the present invention there is provided apparatus for carrying out the polymerisation or copolymerisation of ethylene such apparatus comprising a polymerisation reactor having at least two zones, a separator, a low pressure hopper, a booster compressor and a high pressure compressor, a fresh ethylene supply line connected to the high pressure compressor and a high pressure connecting line from the compressor to the first zone of the polymerisation reactor, a gas transfer line from the separator to a further high pressure compressor and a further high pressure connecting line from the further high compressor to at least one zone, other than the first zone, of the polymerisation reactor, a low pressure gas transfer line from the low pressure hopper to the booster compressor and a connecting line from the booster compressor either to the fresh ethylene supply line or to the gas transfer line and at least one catalyst injection point either in the first zone of the polymerisation reactor or in the high pressure connecting line to the first zone of the polymerisation reactor.

The apparatus may additionally include one or more supply lines for a comonomer, an inert diluent and/or a chain transfer agent to the system and if such supply lines are provided they are preferably arranged to supply the comonomer and/or inert diluent to the fresh ethylene supply line whilst the supply line for the chain transfer agent is preferably connected to the gas transfer lines. A further fresh ethylene supply line may connect to the gas transfer line.

It should be appreciated that the high pressure compressor and the further high pressure compressor can be different cylinders of a multi-cylinder compressor. Alternatively a number of different high pressure compressors are used, and each supply or transfer line is connected to at least one of these compressors.

In one form of the apparatus of the present invention, the polymerisation reactor has at least three zones, and the gas transfer line is divided into two subsidiary transfer lines, one of said subsidiary lines being connected to the further high pressure compressor and the further high pressure connecting line leads to the second zone of the polymerisation reactor, the supply line for the chain transfer agent is connected to the other of said subsidiary lines and the combined line is connected to a second further high pressure compressor and a second further high pressure connecting line leads from the second further high pressure compressor to the third, or a subsequent, zone of the polymerisation reactor.

In all embodiments, the apparatus includes polymer withdrawal line from the polymerisation reactor to the separator and a molten polymer line from the separator to the low pressure hopper.

In order that the present invention may be more readily understood, reference will be made to the accompanying drawings which are diagrammatic representations of apparatus in accordance with the invention and wherein.

Figure 1:
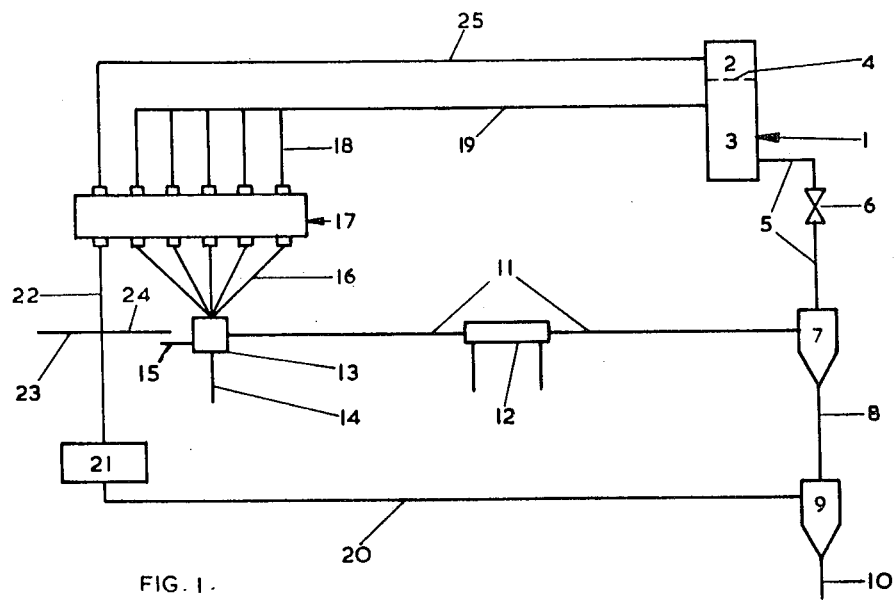
FIG. 1 illustrates an apparatus having a two zone reactor.

In FIG. 1, a polymerisation reactor 1, which is a stirred reactor, is divided internally into two zones, 2 and 3, by a baffle 4, which is conveniently mounted on the stirrer. From zone 3, a polymer withdrawal line 5 leads, through a valve 6, to a separator 7. From the bottom of the separator 7, a molten polymer line 8 leads to a low pressure hopper 9 from which a further polymer transfer line 10 leads to an extruder (not shown).

From the separator 7, a gas transfer line 11 leads, through a cooler 12, to a mixing vessel 13. To the vessel 13 are connected ethylene and hydrogen supply lines 14 and 15 which are connected respectively to a supply of ethylene (not shown) and a supply of hydrogen (not shown). From the vessel 13, five connector lines 16 lead to five different cylinders of a six cylinder high pressure compressor 17. From the outlets of these five cylinders, high pressure connector lines 18 merge to form a high pressure connecting line 19 to zone 3 of the reactor 1.

From the hopper 9, a low pressure gas transfer line 20 leads to a booster compressor 21 and from the outlet of compressor 21 a connecting line 22 leads to the sixth cylinder of the compressor 17. An ethylene supply line 23, from a supply of ethylene (not shown) is connected to the line 22. A further supply line 24, from a supply of comonomer or diluent (not shown) is also connected to the line 22. From the sixth cylinder of the compressor 17, a high pressure connecting line 25 leads to zone 2 of the reactor 1. The pressure in the reactor 1 is controlled by the rate of pumping of the compressor 17 and the setting of valve 6. The rate of pumping of booster compressor 21 controls the pressure in the hopper 9 whilst the pressure in separator 7 is controlled by the pressure of the ethylene supply in line 14.

Figure 2:
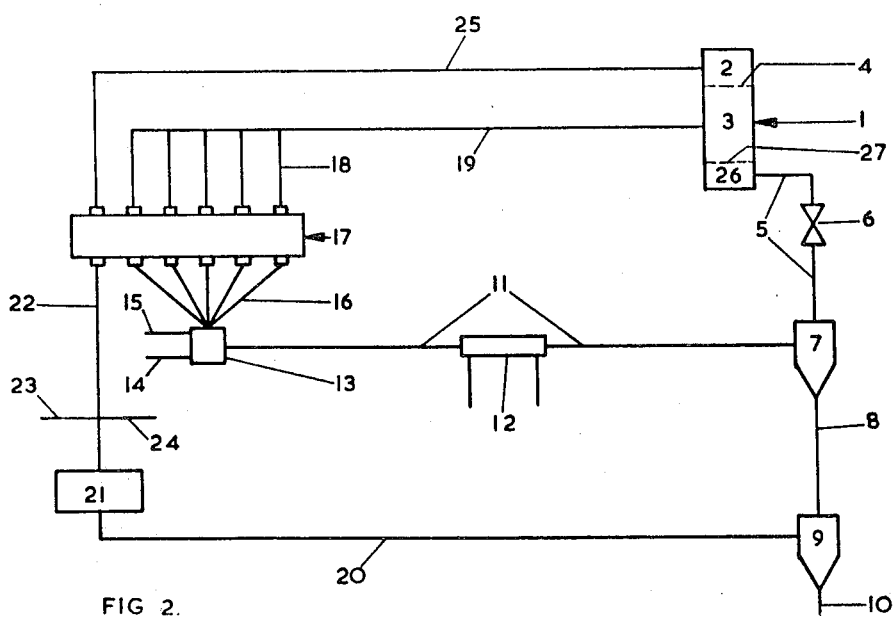
FIG. 2 illustrates an apparatus having a three zone reactor.

In FIG. 2, the corresponding sections of the apparatus are identified as in FIG. 1. The reactor is divided in the zones, 2, 3 and a third zone 26 by baffle 4 and a second baffle 27 which is also conveniently mounted on the stirrer. The lines 19 and 25 are connected to zones 3 and 2 respectively and the reaction mixture from zone 3 passes to zone 26 and is withdrawn from the reactor 1 through the line 5.

Figure 3:
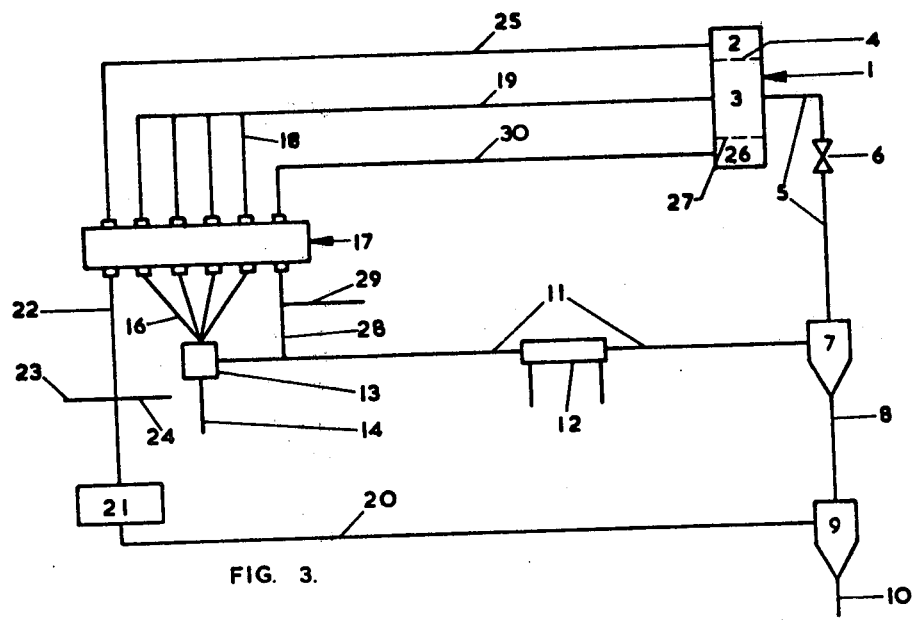
FIG. 3 illustrates an alternative apparatus having a three zone reactor.

In the arrangement of FIG. 3, corresponding sections of the apparatus are identified as in FIGS. 1 and 2. The line 5 is connected to zone 3 of the reaction 1. A subsidiary gas transfer line 28 divides from the gas line 11 and connects to the first cylinder of the compressor 17. To the line 28 a supply line 29 is connected to a supply of hydrogen (not shown). The first cylinder of compressor 17 is connected to the zone 26 of reactor 1 by a further high pressure connecting line 30. The connector lines 16 from the vessel 13 lead to the second to fifth cylinders of the compressor 17.

Figure 4:
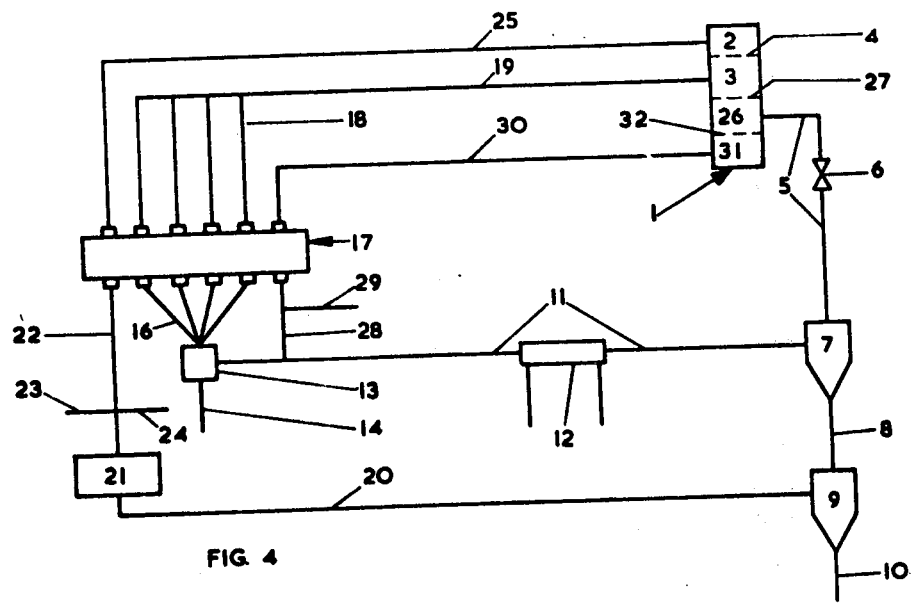
FIG. 4 illustrates an apparatus having a four zone reactor.

In the embodiment of FIG. 4, corresponding sections are identified as in FIGS. 1 to 3. The reactor 1 is divided into four zones 2, 3, 26 and 31 by baffles 4, 27 and 32 which are conveniently mounted on the stirrer. Gas is introduced into zones 2, 3, and 31 and the reaction mixture is withdrawn from zone 26.

In all the embodiments, there is a catalyst injection point (not shown) in zone 2 of the polymerisation reactor 1.

In operation, in all the embodiments illustrated, the reactor 1 is maintained at a pressure in the range 300 to 1000 kgm/cm$^2$, the pressure in separator 7 is in the range 20 to 60 kgm/cm$^2$ and the pressure in hopper 9 is in the range 0.1 to 10 kgm/cm$^2$. Booster 21 raises the pressure of the gas from the hopper 9 up to about the same pressure as that of the gas from the separator 7. Compressor 17 raises the pressure of all the gas streams up to the pressure of the reactor 1. The temperature of the gases in lines 19, 25 and 30 is typically about 40°C. The temperature in zone 2 of reactor 1 is about 160°C, in zone 3 the temperature is about 200°C whilst in zones 26 and 31 the temperature can be 220°C or higher.

In all the embodiments, hydrogen is used as a chain transfer agent and the different feeds contain different proportions of hydrogen. The gas stream in gas transfer line 11 contains a higher proportion of hydrogen than the gas stream in line 20. Thus, in the arrangement of FIGS. 1 and 2 the gas from the hopper 9 contains a lower proportion of hydrogen than the gas from separator 7 and is further diluted with fresh ethylene and either comonomer or diluent before being recycled to zone 2 of reactor 1, whilst the other gas stream is mixed with further hydrogen before being recycled.

In the embodiment of FIGS. 3 and 4, the hydrogen depleted gas stream in line 20 is further diluted with fresh ethylene and either comonomer or diluent, and recycled to zone 2 of the reactor. The hydrogen enriched stream in line 11 is diluted with ethylene in vessel 13 and recycled to zone 3, but the gas in line 19 is enriched in hydrogen relative to the gas in line 25. A proportion of the hydrogen enriched stream in line 11 is passed via the subsidiary gas transfer line 28, further enriched with hydrogen from supply line 29 and recycled to zone 26 or 31 of reactor 1.

In all the embodiments, the increase in hydrogen content is associated with the use of a higher polymerisation temperature and thus the polymer obtained in each succeeding zone will be of decreasing molecular weight. Removal of the product from an intermediate zone of the reactor as in the arrangements of FIGS. 3 and 4 has the effect of giving a product having a broad molecular weight distribution.

It will be appreciated that it is unnecessary to introduce the additional ethylene into the system at more than one point and thus in all the embodiments illustrated one of the ethylene supply lines 14 or 23 can be omitted. In such a case it is preferred to introduce ethylene into the system through the line 23 only in order to obtain efficient use of the first zone of the reactor. It should be noted, however, that it is preferred to introduce the fresh ethylene into the system at more than one point.

In the embodiments described, the products formed in the different zone are of different molecular weights. In alternative embodiments the hydrogen can be omitted and a comonomer and/or an inert diluent used to give alternative effects on the characteristics of the product obtained. Thus, instead of, or in addition to, the use of hydrogen, one or more comonomers, and/or inert diluents may be introduced into the system using the procedures generally described in respect of FIGS. 1 to 4. When operating using the preferred conditions in the pressure range 300–1000 kgm/cm² at least a proportion of the comonomers and/or diluent is introduced into the line 22 to compensate for the fresh ethylene added which would otherwise tend to give two phase conditions in the first zone of the polymerisation reactor.

Other embodiments of the present invention will be apparent to the skilled worker and may be performed without departing from the scope of the invention as disclosed herein.

We claim:

1. A process for the polymerization or copolymerization of ethylene in at least two reaction zones comprising:
   a. passing a product mixture of ethylene, an ethylene polymer, and at least one further component selected from the group consisting of comonomer, chain transfer agent and inert diluent at a pressure in the range 300 to 3000 kgm/cm² from a reaction zone into a separator maintained at a pressure below the pressure of the product mixture, effecting separation into a gas phase and a liquid phase, said liquid phase comprising the ethylene polymer and dissolved gas;
   b. passing said liquid phase to a low pressure hopper maintained at a pressure below that of said separator and removing the major portion of the dissolved gas from the polymer and low pressure hopper;
   c. compressing the gas removed from said low pressure hopper to an intermediate pressure;
   d. providing a stream of fresh ethylene and passing it to a compressor;
   e. compressing the gas stream of fresh ethylene and passing it to the first zone of the polymerization reactor,
   f. optionally mixing the gas phase from the separator with either a chain transfer agent, a stream of fresh ethylene or both which stream of fresh ethylene optionally contains comonomer, inert diluent or both,
   g. passing the resulting gas phase to a compressor and compressing this gas phase, and passing this gas phase to at least one zone, other than the first zone of the polymerization reactor;
   h. mixing the compressed gas from the low pressure hopper with either
      1. the stream of fresh ethylene which is compressed and passed to the first stage of the polymerization reactor, or
      2. the gas phase from the separator which is compressed and passed to the polymerization reactor; and
   i. introducing a polymerization catalyst into at least the first zone of the polymerization reactor.

2. The process of claim 1 wherein polymerisation is effected in two zones, the gas from the low pressure hopper is compressed to an intermediate pressure, mixed with fresh ethylene, compressed further and introduced into the first zone of the polymerisation reactor, and the gas from the separator is mixed with fresh ethylene and sufficient quantity of a chain transfer agent to replace that lost from the system, compressed and introduced into the second zone of the polymerisation reactor.

3. The process of claim 1 wherein polymerisation is effected in at least three zones, the gas from the low pressure hopper is compressed, mixed with fresh ethylene, compressed further and introduced into the first zone of the polymerisation reactor, the gas from the separator is mixed with fresh ethylene and a sufficient quantity of a chain transfer agent to replace that lost from the system, compressed and introduced into the second or subsequent zone of the polymerisation reactor and the product mixture is withdrawn from a zone into which there is no direct feed of ethylene from the high pressure compressor.

4. The process of claim 1 wherein polymerisation is effected in at least three zones, the gas from the low pressure hopper is compressed, mixed with fresh ethylene, compressed further and introduced into the first zone of the polymerisation reactor, the gas from the separator is divided into two streams, fresh ethylene is introduced into one of these streams which is compressed and passed to at least the second zone of the polymerisation reactor, a chain transfer agent, and optionally further fresh ethylene, is introduced into the other of the gas streams from the separator, this gas stream is compressed and introduced into a zone of the polymerisation reactor which is distinct from, and subsequent to, any zone into which the first part of the gas stream from the separator is introduced.

5. The process of claim 4 wherein polymerisation is effected in three zones and the product mixture is withdrawn from the second zone.

6. The process of claim 4 wherein polymerisation is effected in four zones, gas streams are introduced into the first, second and fourth zones, and the product mixture is withdrawn from the third zone.

7. The process of claim 1 which comprises subjecting at least some of the fresh ethylene to a dimerisation stage and converting a proportion of the ethylene to butene-1.

8. The process of claim 1 wherein a mixture of 0–80% by weight of a volatile, inert diluent, 0–95% by weight of at least one 1-olefine monomer and from 5 up to 80% by weight of ethylene is introduced into the polymerisation reactor and contacted with a transition metal polymerisation catalyst at a temperature of from 100°C to 350°C and a pressure of from 300 to 1000 kgm/cm².

9. Apparatus for the polymerization or copolymerization of ethylene comprising a polymerization reactor having at least two zones, one of said zones being in communication with, a separator, a low pressure hopper in communication with the separator, said low pressure hopper having a product withdrawal line, a booster compressor and a high pressure compressor, a valve to control the pressure within the polymerization reactor, a fresh ethylene supply line connected to the high pressure compressor and a high pressure connecting line from said high pressure compressor to the first zone of the polymerization reactor, a gas transfer line from the separator to a further high pressure compressor and a further high pressure connecting line from the further high pressure compressor to at least one zone, other than the first zone, of the polymerization reactor, and a low pressure gas transfer line from the low pressure hopper to the booster compressor and a connecting line from the booster compressor either to the fresh ethylene supply line or to the gas transfer line from the separator and at least one catalyst injection point either in the first zone of the polymerization reactor or in the high pressure connecting line to the first zone of the polymerization reactor.

10. The apparatus of claim 9 wherein a comonomer supply line and/or an inert diluent supply line are connected to the fresh ethylene supply line and a supply line for a chain transfer agent is connected to the gas transfer line from the separator.

11. The apparatus of claim 9 wherein a further fresh ethylene supply line is connected to the gas transfer line from the separator.

12. The apparatus of claim 9 wherein the polymerisation reactor has at least three zones, and the gas transfer line from the separator is divided into two subsidiary transfer lines, one of said subsidiary lines being connected to the further high pressure compressor, and the further high pressure connecting line leads to the second zone of the polymerisation reactor, and a supply line for a chain transfer agent is connected to the other of said subsidiary lines and the combined line is connected to a second further high pressure compressor and a second further high pressure connecting line leads from the second further high pressure compressor to the third or a subsequent zone of the polymerisation reactor.

13. The apparatus of claim 12 wherein the polymerisation reactor has three zones and a polymer withdrawal line connects the second zone of the polymerisation reactor to the separator.

14. The apparatus of claim 12 wherein the polymerisation reactor has four zones, the second further high pressure connecting line is connected to the fourth zone and a polymer withdrawal line connects the third zone of the polymerisation reactor to the separator.

15. A process according to claim 1 comprising mixing at least one further component selected from the group consisting of comonomer, inert diluent and chain transfer agent with said stream of fresh ethylene in step (d).

* * * * *